Patented Nov. 15, 1938

2,137,205

UNITED STATES PATENT OFFICE 2,137,205

TREATMENT OF FOOD MATERIALS

William W. Cowgill, Fairfield, Conn., assignor to Sardik Incorporated, Jersey City, N. J., a corporation of Delaware No Drawing. Application May 2, 1936, Serial No. 77,543. Renewed September 21, 1938

2 Claims. (Cl. 99—193)

This invention relates to the preservation of food materials by freezing.

Heretofore, various natural food materials have been frozen to permit their being kept for relatively extended periods without deterioration. It has been found, however, that certain types of frozen foods, after various periods ranging approximately from six to ten months, lose much of their fresh color, flavor, aroma and appearance, while the structure of the material is found to be soft and mushy on subsequent thawing for use.

An object of this invention is to provide a method of freezing food materials of the type subject to this form of deterioration in which such deterioration will be substantially reduced, and which will permit the satisfactory keeping of the material over relatively extended periods of time.

This and other objects which will be apparent to those skilled in the art are accomplished by means of the invention hereinafter described.

In the customary mode of operations heretofore practiced, the food material is usually packed in a container and then subjected to a freezing temperature. Various lengths of time are required to completely freeze the material, ranging from two or three days in the case of large containers such as barrels, to shorter lengths of time in the case of smaller packages. Before and during the freezing period the container is sometimes agitated so that the final frozen mass will be homogeneous. With barrels, this is accomplished by rolling the barrels just before they are subjected to the freezing temperature and again at intervals during the freezing operation. During subsequent shipment and storage, the containers and material are kept at a temperature below freezing.

My invention will be described in detail in connection with the preservation of strawberries as a typical example.

When strawberries are treated in the manner set forth above, it will be found that part of the juice in the berries, usually from 30% to 50%, bleeds or leaks out of the berries during the period of the freezing operation and before complete freezing has been effected. Those constituents which are responsible for the color and flavor of the original berries, together with a large percentage of the berries' natural pectin content tend to leave with the juice. At the same time, some oxidation occurs due to the presence of air in the spaces around the berries within the barrel.

In order to prevent the above described deterioration, I mix dry pectin, which I obtain from an extraneous source, with the berries at the time they are packed, and before freezing, as more fully hereinafter described.

When it is desired to pack the berries with sugar, as is frequently done when using large containers, 300 pounds of berries may be packed in a 50 gallon wooden barrel in the usual way with approximately 150 pounds of sugar, the material being packed in alternate layers of strawberries and sugar until the barrel is filled. For the most part, the berries are whole, although a certain amount of accidental crushing may occur. During packing of the material there is thoroughly mixed with it a dry, substantially pure, non-acid pectin in an amount and of a grade sufficient to provide such juices as leak out of the berries with a pectin content approximating the natural pectin content of the original material. In the present example, I have found approximately 26 ounces of 100 grade pectin to be satisfactory. It is desirable to use the most readily soluble form of high grade pectin obtainable as any lack of solubility tends to lessen the desired effect.

When sugar is employed, the pectin may be introduced either with the sugar or with the fruit, or both, as long as it is scattered uniformly throughout the material, but I prefer to introduce it into the barrel with the sugar as this now seems the most convenient way. If no sugar is employed in packing, then the pectin is mixed uniformly with the berries. The barrel is then sealed up and rolled to thoroughly mix the contents after which the material is frozen by placing the barrel in cold storage in a temperature of approximately 10° F.

With barrels of the above size, the freezing operation lasts for two or three days. During this time also, the barrel may be rolled occasionally to insure the frozen mass being substantially homogeneous.

The pectin becomes dispersed throughout the juices on the surfaces of the berries, and throughout such juices as may leak out of the berries before complete freezing is accomplished. It forms therewith a pectin-sugar syrup having approximately the same pectin content as the natural pectin content of the original berries. The fruit retains substantially its original natural pectin content, oxidation is greatly reduced if not entirely eliminated, and upon thawing the berries will be found to more nearly approximate their original color, aroma and structure.

The invention can be variously modified and adapted within the scope of the appended claims.

I claim:

1. The process of preserving fresh fruit and vegetable material substantially without loss of juice during the period of preservation, which consists in packing the fresh material in a container, dispersing particles of substantially pure, non-acid pectin in non-hydrated, non-gelatinous condition throughout the fresh material and in intimate contact with the surfaces thereof, so as to be capable of readily combining with any juice exuded from the material, agitating the material during the preserving operation to facilitate intimate mixing of the fresh material and pectin, and freezing the material in the container.

2. The process of preserving fresh fruit and vegetable material substantially without loss of juice during the period of preservation, which consists in packing the fresh material in a container, dispersing a mixture of sugar and particles of substantially pure, non-acid pectin in non-hydrated, non-gelatinous condition throughout the fresh material and in intimate contact with the surfaces thereof, so that said pectin is capable of readily combining with any juice exuded from the material, agitating the mixture during the preserving operation to facilitate intimate mixing of the fresh material with the sugar and pectin, and freezing the material in the container.

WILLIAM W. COWGILL.